Aug. 12, 1969   G. J. MARTIN   3,460,567

RELIEF-MAKEUP CHECK ASSEMBLY FOR DIRECTIONAL CONTROL VALVES

Filed Oct. 23, 1967

INVENTOR
GEORGE J. MARTIN
BY Oberlin, Maky, Donnelly & Renner
ATTORNEYS

United States Patent Office 3,460,567
Patented Aug. 12, 1969

3,460,567
RELIEF-MAKEUP CHECK ASSEMBLY FOR
DIRECTIONAL CONTROL VALVES
George J. Martin, Lyndhurst, Ohio, assignor to Parker-Hannifin Corporation, Cleveland, Ohio, a corporation of Ohio
Filed Oct. 23, 1967, Ser. No. 677,306
Int. Cl. F16k 31/36, 31/12
U.S. Cl. 137—596
11 Claims

ABSTRACT OF THE DISCLOSURE

A relief-makeup check assembly for directional control valves having a movable seat for the main valve member which provides a wide passage for increased flow from the tank to the motor passage when the return passage pressure is higher than the motor passage pressure to prevent cavitation under high shock loads.

Background of the invention

This invention relates generally as indicated to a relief-makeup check assembly for directional control valves and more particularly to a relief-makeup check assembly which provides a wider passage for flow of makeup fluid from the tank to a motor passage of a hydraulic motor to prevent cavitation when the pressure in the motor passage drops below tank pressure than for relieving shock pressure from the motor passage to tank under high shock loads.

Hydraulic motors which encounter substantial shock loads are usually provided with some means for relieving excessive shock pressures created by the shock loads to protect the hydraulic motor and directional control valve for actuating the same against damage. Such excessive shock loads may occur, for example, with an end loader which is handling a heavy load when actuation of the hydraulic motor is arrested. Even with the hydraulic motor locked in neutral position, excessive shock loads may be encountered as when a device such as a back hoe is backed into an obstruction at the side of a trench or the like. Of course, if high shock pressures are relieved from one end of a hydraulic motor, additional fluid must be supplied to the other end to prevent cavitation in the fluid circuit between the hydraulic motor and closed directional control valve. Cavitation will also occur if the load, because of its weight, tends to move faster than the system pump can supply fluid to the hydraulic motor.

Various types of relief-check assemblies have been devised which will both relieve high shock pressures and preclude cavitation, an example being disclosed in the U.S. application of Robert B. Olen, Ser. No. 568,701, filed July 20, 1966 Patent No. 3,362,430, issued Jan. 9, 1968. Although the results obtained with known devices of this type are generally quite satisfactory, there are occasions when it is desirable to provide for greater flow into the fluid circuit between the hydraulic motor and directional control valve to prevent cavitation than from such fluid circuit to relieve excessive pressure, as for example, when substantial voids are created in the hydraulic motor due to rapid piston movement under extremely high shock loads.

Summary of the invention

With the foregoing in mind, it is a principal object of this invention to provide a relief-makeup check assembly of the type described in which the seat for the main valve member is movable only under higher fluid pressures in the return passage than in the motor passage to provide a wider passage than provided by opening of the main valve member alone for increased flow from the tank to the motor passage to prevent cavitation under shock loads. Excessive pressure is relieved in conventional manner by opening of the main valve member while the seat therefor remains substantially stationary.

Another object is to provide in combination with such a relief-makeup check assembly a load check in the same bore as the relief-makeup check assembly.

Other objects and advantages of the present invention will become apparent as the following description proceeds.

To the accomplishment of the foregoing and related ends, the invention then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Brief description of the drawing

In the annexed drawing:

FIG. 3 showing the main valve member open and the movable seat closed for relieving excess fluid pressure from the motor passage to tank; and FIG. 4 showing both the main valve member and movable seat fully retracted for providing increased flow from the tank to the motor passage to prevent cavitation.

Description of the preferred embodiment

Figure 1:
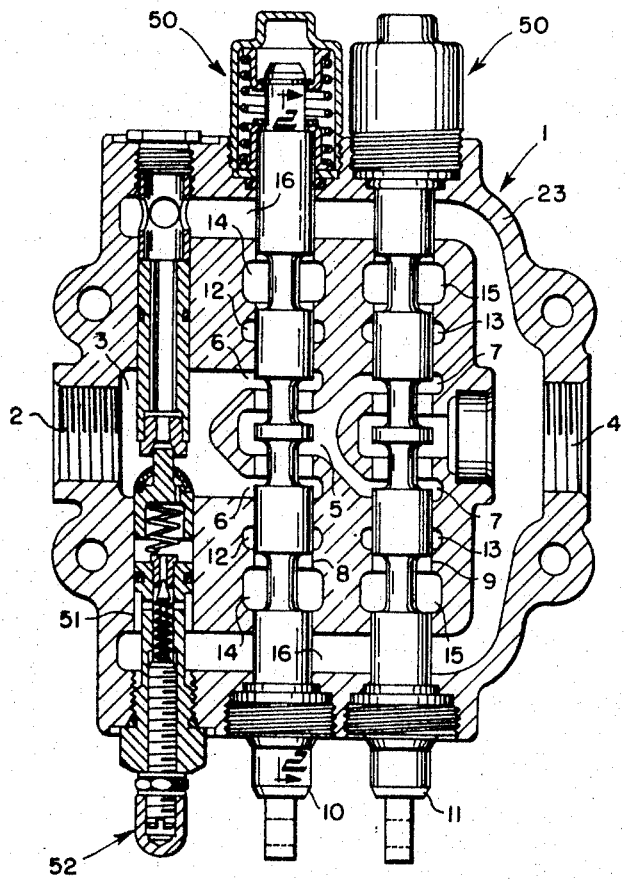
FIG. 1 is a longitudinal section through a directional control valve embodying the relief-makeup check assembly of the present invention.

Referring now more particularly to the drawings, in FIG. 1 there is illustrated a directional control valve 1, the housing of which has a pressure inlet port 2 in communication with the discharge of a pump, not shown, an inlet chamber 3 into which the fluid passes from the inlet port 2, a fluid return port 4 for connection with a fluid reservoir, also not shown, and a bypass passage 5 communicating the inlet chamber 3 with the fluid return port 4. Intersecting the various branches 6, 6 and 7, 7 of the bypass passage 5 are a pair of spool bores 8, 9 each containing a spool valve 10, 11, respectively. Straddling the respective bypass branches 6, 6 and 7, 7 are pressure feed passages 12, 12 and 13, 13, motor passages 14, 14 and 15, 15, and return passages 16, 16 which communicate directly with the fluid return port 4.

Figure 2:
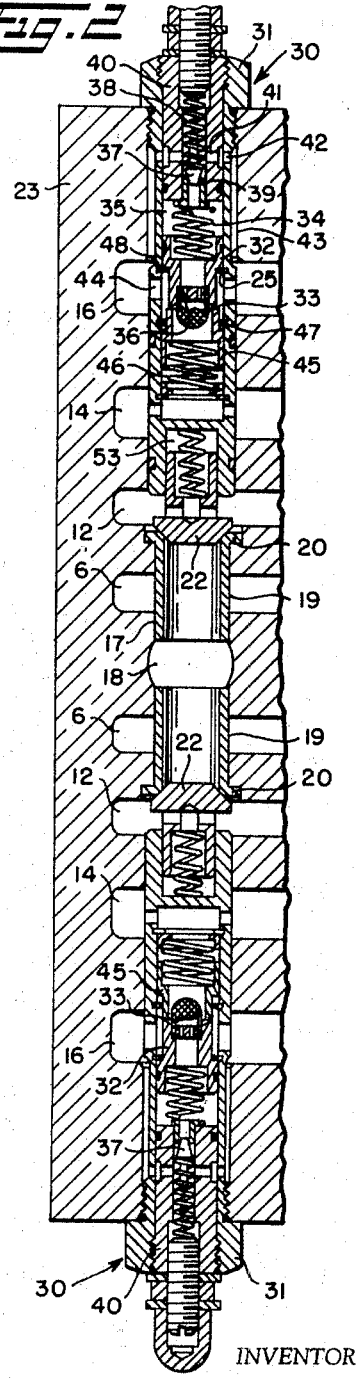
FIG. 2 is an enlarged fragmentary transverse section through a pair of such relief-makeup check assemblies, taken substantially on the plane of the line 2—2, FIG. 1.

Additional bores 17 are provided in the control valve housing 23 (only one of which is shown in FIG. 2) parallel to their respective spool bores 8 and 9 and intersected along their lengths by their associated bypass branches 6, 6 and 7, 7, pressure feed passages 12, 12 and 13, 13, motor passages 14, 14 and 15, 15, and return passages 16, 16. Fuid may be supplied to each of the bores 17 from the inlet chamber 3 through an inlet trunk passage 18 which intersects the bores 17 intermediate the respective bypass branches 6,6 and 7,7. Sleeves 19 in the bores 17 isolate the bypass branches 6, 6 and 7, 7 from the bores 17 so that the high fluid pressure in the trunk passage 18 will not be discharged to tank. The outer ends 20 of the sleeves 19 desirably provide seats for load check valves 22 in the bores 17 which prevent reverse flow of fluid from one motor circuit to another when both spool valves 10 and 11 are in operative position and one of the hydraulic motors actuated thereby is operating under greater load than the other, as well known in the art.

Also contained in each of the bores 17 outwardly of the load check valves 22 are relieve-makeup check assemblies 30 constructed in accordance with this invention. Since all of the relief makeup check assemblies 30 are the same, only the assembly which is associated with the upper pressure feed passage 12 and upper motor passage 14 for the spool valve 10 will be described in detail. Such relief-makeup check assembly 30 may comprise a main tubular body member 31 screwed into the upper end of the bore 17 and having a main valve member 32 therein which is biased into engagement with a seat 33 by a weak spring 34. Behind the main valve member 32 there is a fluid chamber 35 having restricted fluid communication with the upper motor passage 14 through one or more orifices 36 in the main valve member 32.

Figure 3:
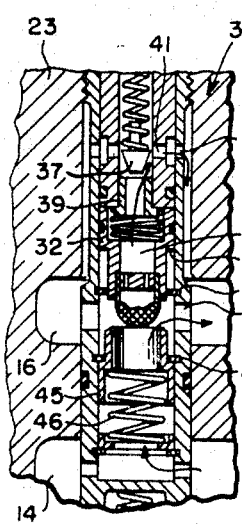
FIGS. 3 and 4 are still further enlarged fragmentary transverse sections through one of such relief-makeup check assemblies.

The pressure in the fluid chamber 35 acts on a pilot relief valve member 37 which is biased by a spring 38 against a seat 39 contained in a pilot relief valve body member 40 threaded into the outer end of the main body member 31. Should the pressure in the fluid chamber 35 exceed the seating force on the pilot relief valve member 37, the pilot relief valve member 37 will open, venting the chamber 35 to the upper return passage 16 through aligned apertures 41, 42 in the body members 40 and 31 and an annular passage 43 between the main body member 31 and wall of the bore 17 more rapidly than fluid can be replenished into the chamber 35 through the orifices 36. As soon as the pressure differential in the motor passage 14 acting on the end of the main valve member 32 exceeds the opposing force of the spring 34, such main valve member will be caused to move away from its seat 33 as shown in FIG. 3 for relieving excess pressure in such motor passage 14 to the return passage 16 via radial apertures 44 in the main body member.

In addition to functioning as a pilot-operated relief valve, the valve member 32 also functions as a check valve when the force exerted by the pressure in the return passage 16 acting on the annular shoulder 25 of the valve member 32 exceeds the opposing force of the pressure in the chamber 35 and the force of the spring 34. This occurs when the pressure in the motor passage 14 drops below the pressure in the return passage 16, as when the hydraulic motor connected to such motor passage is demanding more fluid than can be provided by the system pump or demanding fluid when it is not available.

Figure 4:
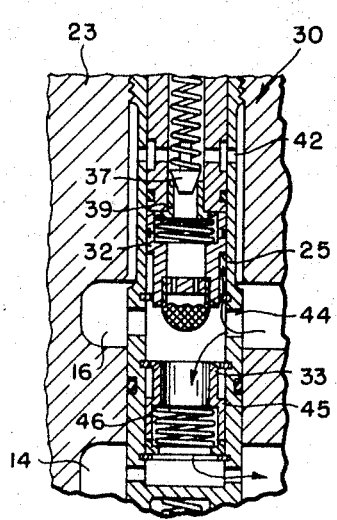

In the usual case, the opening of the main valve member 32 as outlined above will result in the supply of sufficient makeup fluid to the motor passage from the return passage to preclude cavitation. However, there are occasions when it may be desirable or even necessary to provide a larger passage than afforded by the opening of the main valve member 32 to supply such makeup fluid, especially if the hydraulic motor encounters extremely high shock loads which causes a large amount of fluid to be relieved from the opposite end of the motor. With the relief-makeup check assembly 30 of the present invention, such increased makeup flow is permitted by making the seat 33 for the main valve member 32 movable in a direction away from the main valve member in response to higher fluid pressures in the return passage than in the motor passage to provide a wider flow passage between such passages 14, 16. As clearly shown in FIGS. 2–4, the seat 33 is in the form of a tubular sleeve 45 slidable in the main body member 31 and biased toward the main valve member 32 by a spring 46 which may be somewhat weaker than the main valve spring 34. A snap ring 47 on the inner wall of the main body member 31 precludes continued movement of the seat 33 toward the main valve member 32 during operation as a relief valve. A similar snap ring 48 on the inner wall of the main body member limits movement of the main valve member 22 toward the seat 33.

Referring now more particularly to the operation of the directional control valve 1, it can be seen that when the spool valves 10 and 11 are in neutral position as shown in FIG. 1, the fluid entering the chamber 3 freely flows through the bypass passage 5 to the fluid return port 4. However, upon movement of one or both of the spool valves 10 and 11 to an operative position, the bypass passage 5 is closed and fluid under pressure is supplied to one or the other of the motor passages 14, 14 or 15, 15 via the trunk passage 18, load check valves 22, and associated feed passages 12, 12 or 13, 13 for actuation of the hydraulic motors connected thereto. The fluid displaced by each hydraulic motor is returned to the tank via the other motor passage and return passage. Thus, for example, if the spool valve 10 is moved upwardly, high pressure fluid is supplied to the lower motor passage 14 with the return through the upper motor passage 14, whereas downward movement of the spool valve 10 will reverse the pressure in the motor passages, making the upper motor passage 14 the pressure outlet and the lower motor passage the return.

Now, if the spool valve 10 is permitted to return to neutral position by the spring centering mechanism 50, fluid will be trapped between the hydraulic motor and the motor passages 14, 14. If the inertia of the load is sufficiently high or a high shock load is subsequently applied to the hydraulic motor, which might occur, for example, by backing a back hoe into engagement with an obstruction in a hole, the high pressure in one of the motor passages will be sufficient to unseat the associated pilot valve member 37 and main valve member 32 for relieving the excess pressure to the return passage 16. At the same time, cavitation is prevented in the other end of the hydraulic motor by opening of the other main valve member 32 and movable seat 33 when the pressure in the other motor passage drops below the pressure in the return passage to provide a large opening for a large flow of makeup fluid to the other motor passage. The operation of the relief-makeup check assemblies 30 for the other spool valve 11 is identical to those for the spool valve 10 just described and accordingly no further discussion of the same is thought to be necessary.

A further passage 51 may be provided in the valve housing 23 connecting the inlet chamber 3 with the return passage 16 for relieving excess pressure in the inlet chamber to tank through a pilot-operated relief valve 52 of conventional type. The pilot relief valves 37 of the relief-makeup check assemblies 30 should not be set to open at pressures less than the relief valve 52 setting or otherwise the valve members 32 may open prematurely under heavy loads.

Moreover, although two relief-makeup check assemblies are shown for each of the double acting spool valves 10, 11, if the installation is such that the shock loads occur only in one of the motor passages, the relief-makeup check assembly for the other motor passage may be eliminated and a conventional check valve substituted therefor to provide makeup fluid as required to prevent cavitation. Likewise, a relief-makeup check assembly need not be provided for every spool valve, and more than two spool valves may be included as required. Also, the bypass passages need not be extended to intersect the bores containing the relief-makeup check assemblies, in which case the sleeves that isolate the bypass passages from the trunk passage and pressure feed passages could be eliminated and the seats for the load checks 22 could be provided in the wall of the bore. The load checks 22 may be slidable in recesses 53 in the inner ends of the main body members 31 for the relief-makeup check assemblies 30 as shown, or may be separate therefrom.

Other modes of applying the principles of the invention may be employed, change being made as regards the details described, provided the features stated in any of the folowing claims or the equivalent of such be employed.

I, therefore, particularly point out and distinctly claim as my invention:

1. In combination, a direction control valve comprising a housing having an inlet port for fluid under pressure, a return passage, and at least one motor passage, and a valve member movable in said housing from neutral position blocking fluid communication between said inlet port and motor passage to either of two operating positions selectively communicating said motor passage with said inlet port and return passage; and a valve assembly including a main valve member normally closing communication between said return and motor passages, a movable seat means for said main valve member, spring means for yieldably maintaining said main valve member in the closed position in engagement with said movable seat means, additional spring means for yieldably maintaining said movable seat means in such closed position, said main valve member being movable away from said movable seat means against the bias of said spring means in response to fluid under pressure in said return passage of magnitude exceeding that in said motor passage to permit flow of fluid from said return passage to said motor passage, said movable seat means also being movable away from said main valve member against the bias of said additional spring means in response to such fluid under pressure in said return passage of magnitude exceeding that in said motor passage to provide for increased flow from said return passage to said motor passage.

2. The combination of claim 1 wherein said first spring means is stronger than said additional spring means, and there is a stop means for limiting the movement of said main valve member in the direction of said movable seat means.

3. The combination of claim 2 wherein said valve assembly further comprises means for permitting said main valve member to be moved away from said movable seat means as a relief valve member in response to fluid under pressure in said motor passage of magnitude exceeding that in said return passage to relieve excess pressure from said motor passage to said return passage, and an additional stop means for limiting the movement of said movable seat means toward said main valve member during movement of said main valve member away from said seat means.

4. In combination, a directional control valve comprising a housing having an inlet port for fluid under pressure, a return passage, and at least one motor passage, and a bore containing valve member movable in said housing from neutral position blocking fluid communication between said inlet port and motor passage to either of two operating positions selectively communicating said motor passage with said inlet port and return passage; and an additional bore in said housing containing a valve assembly including a main tubular body member threadedly received in the outer end of said additional bore, said tubular body member having axially spaced radial apertures therein communicating the interior of said tubular body member with said return and motor passages, a movable seat means contained in said tubular body member intermediate said axially spaced radial apertures, a main valve means movable in said tubular body member into and out of engagement with said movable seat means for effectively closing and opening fluid communication between said return and motor passages through said tubular body member, and spring means for yieldably maintaining said main valve means and movable seat means in engagement with each other for closing such fluid communications between said return and motor passages, said main valve means being responsive to fluid under pressure in said return passage of magnitude exceeding that in said motor passage to move away from said movable seat means to permit flow of fluid from said return passage to said motor passage, and said movable seat means also being responsive to such fluid under pressure in said return passage of magnitude exceeding that in said motor passage to move away from said main valve means to permit increased flow from said return passage to said motor passage.

5. The combination of claim 4 wherein said valve assembly further comprises a snap ring in said tubular body member for locating said main valve means in the closed position.

6. The combination of claim 4 wherein said valve assembly further comprises means for permitting said main valve means to be moved away from said movable seat means as a relief valve member by fluid under pressure in said motor passage of magnitude exceeding that in said return passage to permit flow of fluid from said motor passage to said return passage, and an additional snap ring in said tubular body member for limiting the extent of movement of said movable seat means toward said main valve means during such movement of said main valve means away from said movable seat means.

7. The combination of claim 6 wherein said means for permitting said movable valve means to be moved as a relief valve member comprises a fluid chamber behind said main valve means having restricted fluid communication wtih said motor passage, and a pilot valve member adapted to vent said fluid chamber when the pressure therein reaches such magnitude, thereby providing a pressure differential acting on said main valve means effective to move said main valve means away from said movable seat means as aforesaid.

8. The combination of claim 7 wherein said means for permitting said main valve means to be moved as a relief valve member further comprises an annular passage between the wall of said aditional bore and said tubular body member communicating the downstream side of said pilot valve member with said return passage.

9. The combination of claim 7 wherein said pilot valve member is contained in a pilot valve body member threaded into said main tubular body member.

10. The combination of claim 4 wherein said housing has a pressure feed passage interconnecting said bores and a trunk passage interconnecting said inlet port with said additional bore for supplying fluid at inlet pressure to said additional bore, and the inner end of said tubular body member has a check valve therein which is spring biased against a seat in said additional bore between said trunk and pressure feed passages for permitting flow only in one direction from said trunk passage to said pressure feed passage.

11. The combination of claim 4 wherein there are a pair of motor passages in said housing, said valve member being movable in said housing from neutral position blocking fluid communication between said inlet port and both motor passages to either of two operating positions selectively communicating said motor passages with said inlet port and return passage; and there are a pair of said valve assemblies in said additional bore normally closing communication between said return passage and said pair of motor passages.

References Cited

UNITED STATES PATENTS

| 3,309,852 | 3/1967 | Allen | 137—596.2 XR |
| 3,160,167 | 12/1964 | Martin | 137—596.12 XR |
| 3,362,430 | 1/1968 | Olen | 137—596 |
| 3,390,700 | 7/1968 | Hodgson et al. | 137—612.1 |

M. CARY NELSON, Primary Examiner

ROBERT J. MILLER, Assistant Examiner

U.S. Cl. X.R.

137—493, 494, 509